Patented Apr. 7, 1925.

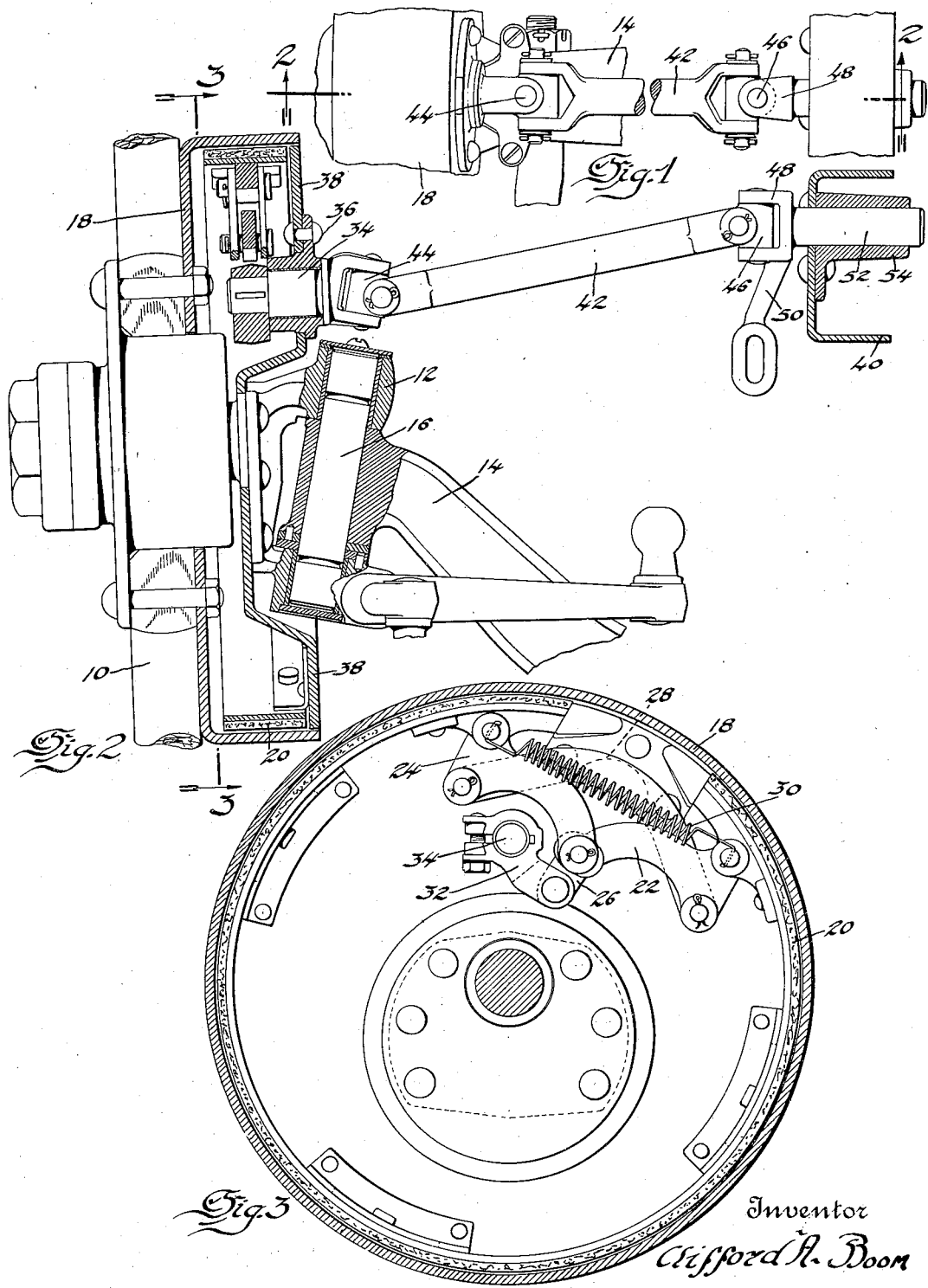

1,532,471

UNITED STATES PATENT OFFICE.

CLIFFORD ARCHIE BOOM, OF FLINT, MICHIGAN, ASSIGNOR TO GENERAL MOTORS CORPORATION, OF DETROIT, MICHIGAN, A CORPORATION OF DELAWARE.

VEHICLE HAVING BRAKES.

Application filed March 15, 1923. Serial No. 625,306.

*To all whom it may concern:*

Be it known that I, CLIFFORD ARCHIE BOOM, a citizen of the United States, and a resident of Flint, county of Genesee, and State of Michigan, have invented certain new and useful Improvements in Vehicles Having Brakes, of which the following is a full, clear, concise, and exact description, such as will enable others skilled in the art to which the invention relates to make and use the same, reference being made therein to the accompanying drawings, which form a part of this specification.

This invention relates to vehicles, and is illustrated as embodied in an automobile having front wheel brakes.

An object of the invention is the provision of novel brake-actuating connections so arranged that movement of the spring-supported chassis frame has no effect on the brakes, the connections being adapted for manufacture on a large scale at a comparatively low cost, and being simple and readily assembled on the car. In the form shown, they include a brake-operating shaft having a universally-connected end portion slidably held by the chassis frame.

The above and other objects and features of the invention, including various novel combinations and desirable particular arrangements and constructions of parts, will be apparent from the following description of the illustrative embodiment of my invention shown in the accompanying drawings, in which:

Figure 1 is a top plan view showing my improved brake operating connections between the wheel and the chassis frame;

Figure 2 is a section on the line 2—2 of Figure 1 showing parts of the brake in vertical section; and Figure 3 is a section on the line 3—3 of Figure 2 showing parts of the brake in side elevation.

The brake shown in the drawings is intended to operate on a front wheel 10 carried by a steering knuckle 12 pivotally mounted on a front axle 14 by means of a king pin 16. The brake comprises a drum 18, inside of which is arranged an expansible and contractable band 20 the opposite ends of which are pivoted to a pair of bell crank levers 22 and 24 both of which are connected to an operating link 26 in such a manner as to constitute a toggle for expanding band 20. The toggle links 22 and 24 are pivoted to a floating link 28 which constitutes a movable anchor for the links so that movement of link 26 radially of drum 18 expands and contracts band 20. The band is normally held in contracted or idle position by a spring 30. Link 26 is operated by an arm 32 clamped on a rock shaft 34 journaled in a bushing 36 riveted or otherwise secured to plate 38 fixed on knuckle 12 and covering the open face of drum 18.

Some of the above described parts are of usual construction and others are more particularly described and are claimed in copending application Ser. No. 664,017, filed September 21, 1923, by Benonie G. Lefere.

According to the present invention the shaft 34 is operated to set the brake by connections which are especially designed for manufacture in large quantities and which can be readily assembled. These connections are arranged to be directly supported by a part of the spring-supported chassis frame 40, which has a limited angular movement with respect to axle 14, in such a manner as to reduce to a minimum the unsprung parts of the brake. In the form selected for illustration the connections include a shaft 42 connected to the brake operating shaft 34 by a universal joint 44 which is in alinement with the king pin 16, so that steering movement of the wheel does not affect the brakes. The other end of shaft 42 is connected by a universal joint 46 to a member having a forked end 48 to receive the universal joint and an operating arm 50 to be connected to the brake pedal or other operating member, and which is formed with a slidable plunger 52 directly received in a perforated lug 54 integral with or fixedly secured to a part of the chassis frame 40. Thus relative movement of the chassis frame and the front axle is taken care of by universal joints 44 and 46 and by sliding movement of plunger 52 in lug 54, without affecting the arrangement for operating the brake by rocking shaft 42 about its axis through arm 50.

While one illustrative embodiment of my invention has been shown and described it is not my intention to limit the scope of the invention to that particular embodiment or otherwise than by the terms of the following claim.

I claim:

A vehicle having, in combination, a dirigible wheel movable about a substantially vertical steering axis, a relatively-movable chassis frame, a brake comprising a drum rotating with the wheel and a non-rotating retarding device, and means for operating the retarding device including a driver-controlled shaft having a universal joint in said steering axis and a second universal joint adjacent said frame and a part beyond the second universal joint which is slidably held by the chassis frame.

In testimony whereof I affix my signature.

CLIFFORD ARCHIE BOOM.